US 8,156,281 B1

(12) United States Patent
Grosner et al.

(10) Patent No.: US 8,156,281 B1
(45) Date of Patent: Apr. 10, 2012

(54) DATA STORAGE SYSTEM AND METHOD USING STORAGE PROFILES TO DEFINE AND MODIFY STORAGE POOLS

(75) Inventors: George J. Grosner, Santa Clara, CA (US); Sonja C. Hickey, Wilmette, IL (US); Gaurav Chawla, Santa Clara, CA (US); Richard C. Barlow, Santa Clara, CA (US); Mark A. Parenti, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 1529 days.

(21) Appl. No.: 11/005,756

(22) Filed: Dec. 7, 2004

(51) Int. Cl.
*G06F 12/00* (2006.01)

(52) U.S. Cl. .. 711/114; 711/153; 711/173; 711/E12.001

(58) Field of Classification Search .................. 711/111, 711/112, 114, 170, 173
See application file for complete search history.

(56) References Cited

U.S. PATENT DOCUMENTS

| | | | |
|---|---|---|---|
| 5,982,367 A * | 11/1999 | Alimpich et al. | 715/810 |
| 6,751,739 B1 * | 6/2004 | Verdun | 713/300 |
| 7,043,619 B1 * | 5/2006 | Knight | 711/170 |
| 7,080,229 B2 * | 7/2006 | Manbert et al. | 711/170 |
| 2001/0034812 A1 * | 10/2001 | Ignatius et al. | 711/112 |
| 2002/0133669 A1 * | 9/2002 | Devireddy et al. | 711/114 |
| 2002/0174306 A1 * | 11/2002 | Gajjar et al. | 711/148 |
| 2004/0230317 A1 * | 11/2004 | Kumar et al. | 700/1 |
| 2004/0250014 A1 * | 12/2004 | Sohn | 711/112 |

OTHER PUBLICATIONS

HPSS Guide, Dec. 2003, http://www4.clearlakeibm.com/hpss/administrators/docs/HTML/rel5.1.0/install_guide/install.html.*

* cited by examiner

*Primary Examiner* — Edward Dudek, Jr.
*Assistant Examiner* — Ralph A Verderamo, III
(74) *Attorney, Agent, or Firm* — Marsh Fischmann & Breyfogle LLP; Kent A. Lembke (57) ABSTRACT

A method and system for allocating storage in a data storage system using one or more storage profiles. A set of storage profiles are provided that each has a set of parameters with values defined for the data storage system and for particular client applications. The method includes receiving a selection of one of the storage profiles, such as from an administrative user interface generated by a storage manager running in conjunction with the data storage system. The selected storage profile is then applied to the data storage system to allocate a portion of the data storage system to a storage pool which is defined by the values of the set of parameters in the selected storage profile. The method includes creating a user-defined storage profile by copying parameters from one of the provided storage profiles and allowing a user to modify or accept the parameters.

18 Claims, 5 Drawing Sheets

DATA STORAGE SYSTEM AND METHOD USING STORAGE PROFILES TO DEFINE AND MODIFY STORAGE POOLS

BACKGROUND OF THE INVENTION

1. Field of the Invention

The present invention relates, in general, to data storage systems and storage in distributed or networked environments, and, more particularly, to a method and system for configuring data storage pools for effective operation for particular implementations or applications.

2. Relevant Background

Within the data storage industry, it is becoming more and more common to network and share data storage devices such as disk drive arrays, tape drive devices, and the like. Data from a number of one or more client devices and software applications being run by such devices is typically stored on or more of the networked data storage devices. In contrast, one client application may be large requiring a number of data storage devices be available or pooled to provide adequate storage capacity and availability for the application. With the growing use of networked data storage, numerous challenges have arisen including how to manage the data storage network so as to most effectively utilize the available storage capacity and devices while providing desired retrieval speed and data availability to the client applications or applications utilizing shared or pooled storage.

In general, a storage pool is a collection of storage volumes that are associated with a class of storage device and typically, with one media type, such as tape, disk, and the like. A storage volume is the basic unit of storage, e.g., allocated space on a disk or on a tape cartridge. In many networked storage systems, a server with data management software uses storage volumes to store data in backed-up, archived, or space-managed files and storage pools can be arranged in a storage pool hierarchy in which each pool is used for differing purposes such as an archive pool, a backup pool, a primary storage pool, a copy storage pool, or other such pools. On another level, the storage pools and the volumes within the pools may be separated into storage libraries.

The use of storage pools within a data storage system can significantly increase the efficient use of the available data storage components and available space, but defining storage pools can be a difficult and time consuming task. In practice, a data storage system is shipped or set up with storage management software but with no storage pools. The customer or an information technology specialist then must operate the storage management software to define and configure the data storage system to support one or more storage pools and volumes within the pool. Some companies within the data storage system ship systems with a default definition of a storage pool and volumes within the pool. However, the default definition is typically selected to provide performance that is acceptable across a broad range of implementations or applications but not particularly well-suited for any of the implementations or applications, which results in inefficiencies such as wasted capacity, undesirable response times, and other performance degradations.

The storage management software can be operated, such as via an administrative command line or an administrative user interface, to change the defaults for the storage pool but due to the number of parameters involved this is a daunting task that is typically best left to personnel very familiar with the data storage system. For example, initial configuration of a storage pool may require that the following parameters be set or defined: pool name, pool type, device class for inclusion in the pool, maximum file size, access modes for the pool (such as read/write, read only, and other access modes), data format, overflow location or next storage pool identification, scratch volumes, cache, migration delay, migration thresholds, migration processes, collocation, reclamation threshold, cyclic redundancy check, and other parameters. In addition to the sheer number of parameters that must be set, proper configuration of a storage pool requires that the interactions of parameters be understood (e.g., how does modifying one parameter affect other operating parameters) and that restrictions be understood (e.g., some parameters cannot be modified in some systems, some functions or parameters are not supported by some storage systems, and/two parameters may be intertwined such that modification of one requires modification of another).

Hence, there remains a need for an improved method and system that enables users of networked and other data storage systems to readily define storage pools within the systems that operate effectively within the data storage system and that support the users' applications or computing environment.

SUMMARY OF THE INVENTION

The present invention addresses the above problems by providing a data storage system that uses sets of predefined storage profiles and user-defined storage profiles to define sets of parameters used by a storage manager to configure or apply one or more storage pools to a set of data storage components. The use of storage profiles helps customers or users of the data storage system to create storage pools and volumes within the pools that are particularly well suited for a particular application or for particular performance requirements. The use of pre-defined storage profiles eliminates or significantly reduces the need for a customer or user to enter parameters to configure a storage system with storage pools. The inventive techniques for creating user-defined storage profiles make it easy for customers or users to configure a storage system in part by reducing the number of parameters that need to be specified when a new volume or storage pool is created or when more storage is allocated to an existing storage pool or volume. Additionally, defining storage profiles allows a user or customer to create a storage configuration strategy that improves or optimizes the performance of applications using the storage as the storage pools can be selected to suit one or more applications. In some cases, two or more applications share or utilize a data storage system and portions of the data storage system can be configured as separate storage pools so as to support each application with a differently configured storage pool.

More particularly, a method is provided for allocating storage in a data storage system. The method involves providing a set of storage profiles each having a set of parameters with values selected or defined for the particular data storage system and, typically, for applications accessing or utilizing the data storage system. The method further includes receiving a selection of one of the storage profiles, such as from an administrative user interface generated by a storage manager running in conjunction with the data storage system. The selected storage profile is then applied to the data storage system to allocate a portion of the data storage system, such as a set of disks in a tray or an array, to a storage pool which is defined by the values of the set of parameters in the selected storage profile. For example, the parameters may set values for segment size, virtual strategy, stripe size, array type, RAID level, read ahead mode, number of drives, disk size, disk speed, cache settings, and the like. The method also includes creating a user-defined storage profile for inclusion in the set of provided or available storage profiles; and this creating includes copying a set of parameters from one of the provided storage profiles and allowing a user to modify or accept these copied parameters. The method may further include a second selecting of a storage profile in which the set of storage profiles is different than the first set provided because of the prior allocation of data storage to a storage pool based on the first selected profile, i.e., later selected storage profiles are assured to be compatible by only allowing selection from compatible storage profiles.

According to another aspect of the invention, a managed storage system is provided that includes a data storage system made up of one or more data storage devices, such as disk arrays, tape drives, and the like. A number of pre-defined storage profiles are stored in the managed storage system. Each profile includes a set of data storage parameters or characteristics with values defining a storage pool compatible with the data storage devices. The managed storage system further includes a storage manager adapted to receive a user selection of one or more of the pre-defined storage profiles and in response, to allocate a portion of the data storage system to a storage pool defined by the values of the data storage parameters in the selected storage profile(s).

DETAILED DESCRIPTION OF THE PREFERRED EMBODIMENTS

The present invention is directed to a system and method for enhancing the effectiveness and ease of configuring a data storage system, such as a server-based storage system including disks and/or tapes, including creating storage pools and associated storage volumes. The system and method utilize storage profiles that are either pre-defined (or factory deliverable) or user-defined. The storage profiles define a set of operating and/or configuration parameters for configuring storage pools within the data storage system and are designed to optimize the use of the storage components for a particular operating environment or for supporting a particular application that is being supported by the data storage system. The use of storage profiles allows users to configure storage based on the needs of their applications without requiring the users to design a new configuration or understanding all of the interaction between the parameters of a single storage pool and between other storage pools within the storage system. The user can simply select a pre-defined storage pool designed to support a particular application or create a new storage profile from scratch or by building upon and modifying an existing profile. The storage profile(s) is then applied to the data storage system to configure the data storage system to effectively support the user's needs.

Figure 1:
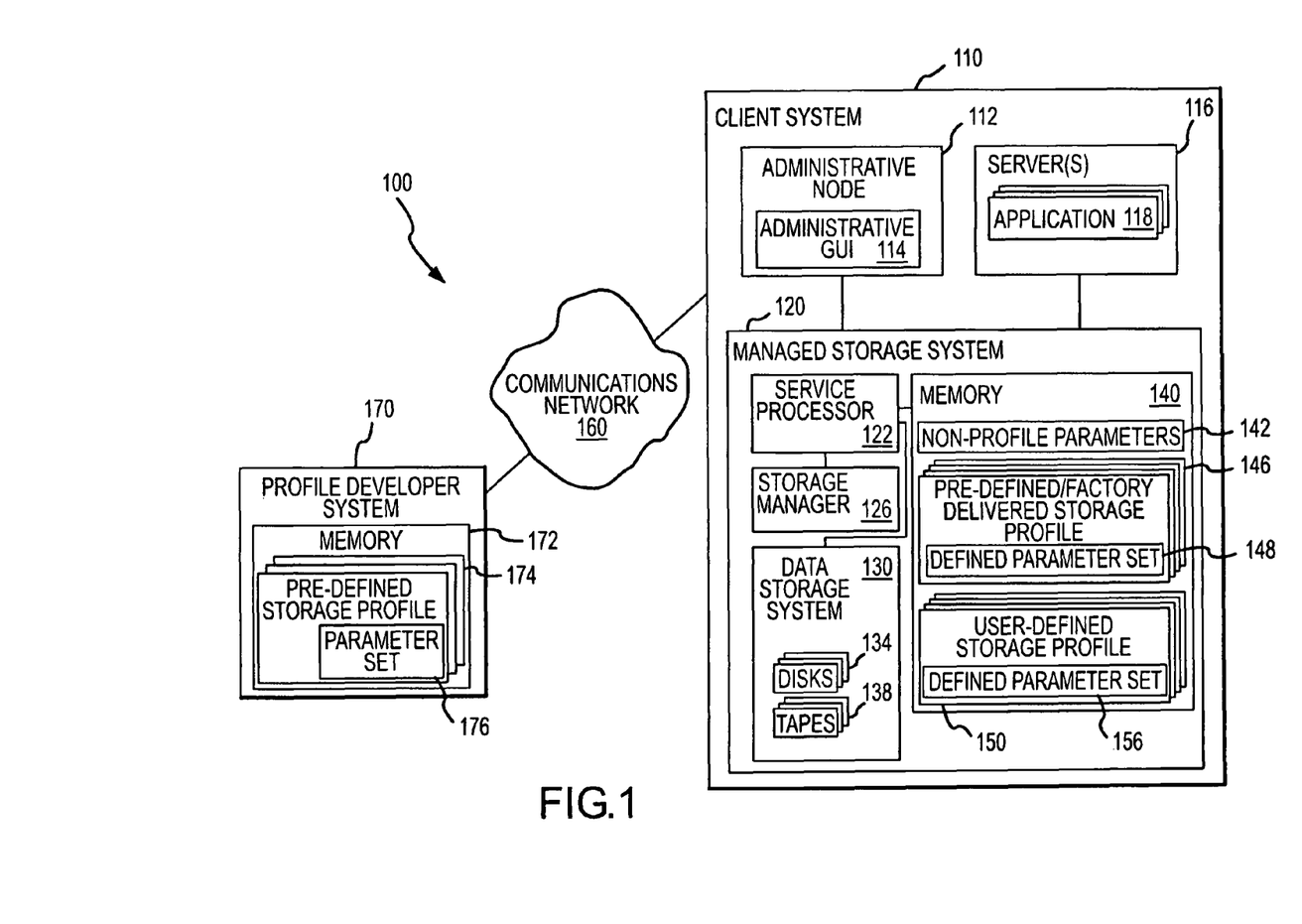
FIG. 1 illustrates in block form an exemplary networked computer system utilizing storage profiles to allocate and configure data storage according to the invention.

The following description begins with a discussion of a networked or distributed computer system 100 with reference to FIG. 1 that includes a managed storage system 120 that is configured to use the storage profile features of the invention to configure its components to support client applications. Along with the discussion of the system 100, an overview of exemplary storage components and their configurations are provided to more fully describe the use of storage profiles. The description continues with a discussion of how storage profiles are used to configure storage at the storage hierarchy level with reference to FIG. 2. With a general understanding of storage profiles understood, the description continues with a discussion of methods for distributing, managing, and configuring storage according to the present invention with reference to FIGS. 3-5.

In the following discussion, computer and network devices, such as the software and hardware devices within the system 100, are described in relation to their function rather than as being limited to particular electronic devices and computer architectures and programming languages. To practice the invention, the computer and network devices may be any devices useful for providing the described functions, including well-known data processing and communication devices and systems, such as application, database, web, and entry level servers, midframe, midrange, and high-end servers, personal computers and computing devices including mobile computing and electronic devices with processing, memory, and input/output components and running code or programs in any useful programming language, and server devices configured to maintain and then transmit digital data over a wired or wireless communications network. Data storage systems and components are described herein generally and are intended to refer to nearly any device and media useful for storing digital data such as tape-based devices and disk-based devices, their controllers or control systems, and any associated software. Data, including transmissions to and from the elements of the network 100 and among other components of the network 100, typically is communicated in digital format following standard communication and transfer protocols, such as TCP/IP, HTTP, HTTPS, FTP, and the like, or IP or non-IP wireless communication protocols such as TCP/IP, TL/PDC-P, and the like.

FIG. 1 illustrates a simplified network or system 100 that incorporates the features of the invention. The system 100 includes a client system 110 that is in communication via a communications network 160 (i.e., the Internet, a LAN, a WAN, or the like) with a profile developer system 170. The system 100 is simplified in the sense that only one client system 110 is shown while system 100 typically will include numerous clients 110. However, once functioning of the client system 110 is understood, its configuration and operation can readily be extended to a system 100 with additional client systems 110. Similarly, the client system 110 is shown to include only one managed storage system 120 which is dedicated to supporting the servers 116 and applications 118 running on the servers 116. In practice, the client system 110 may provide access to the managed storage system 120 to additional client systems, such as over the network 160, and may include additional managed storage systems similar to system 120. These more complex embodiments of system 100 are believed to be within the breadth of the present discussion and the claims that follow this detailed description.

As shown, the client system 110 includes an administrative node 112 such as a desktop, laptop, notebook, handheld or other computing device with a monitor on which is provided an administrative graphical user interface (GUI) 114. The administrative GUI 114 is used to display information regarding the managed storage system 120, such as through interfaces provided by the storage manager 126, including storage configuration parameters defined by storage profiles 146, 150. The administrative node 112 is also operable to allow a user or operator to enter input including selection of profiles, commands to apply profiles to particular portions of the managed storage system 120, and entering profile parameters (e.g., see the input interface shown in FIG. 5). The client system 110 is intended to represent an entity's computer system or network and as such includes one or more servers or other computing devices 116 running one or more applications 118. As will become clear, the system 110 is adapted according to the invention for configuring data storage 130 in managed storage system 120 to effectively and efficiently support the applications 118 and to otherwise support operation of the client system 110.

Figure 2:
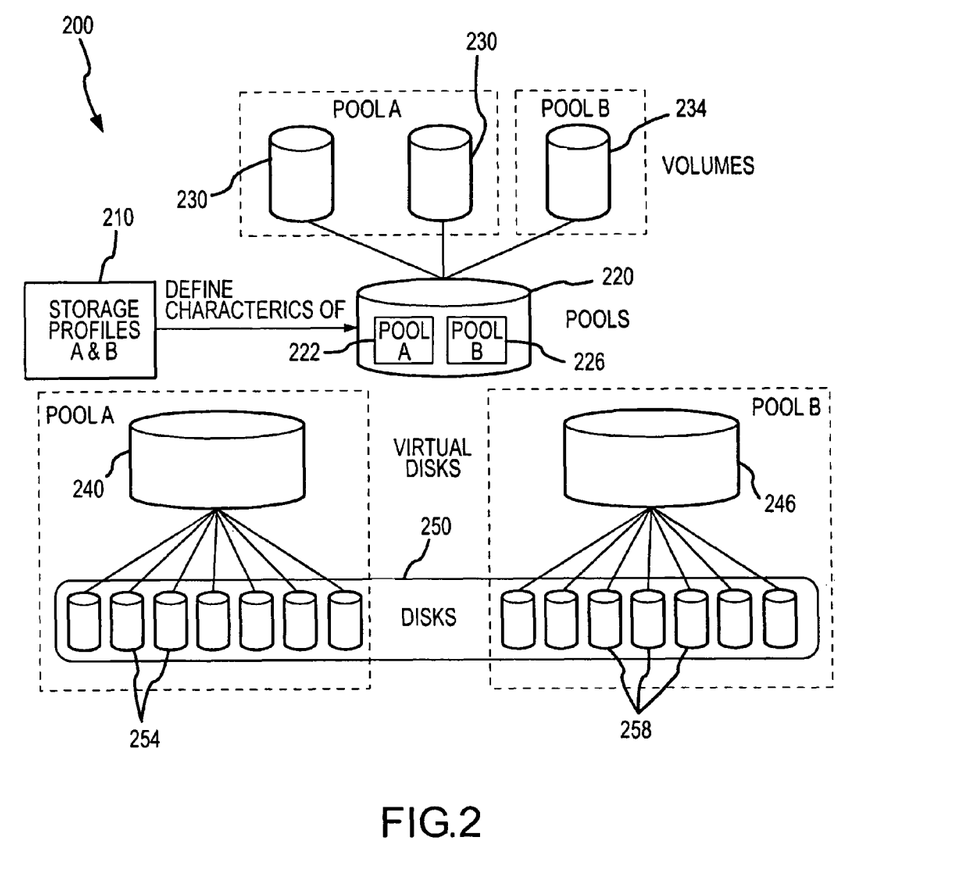
FIG. 2 illustrates in simplified block diagram form a data storage hierarchy implemented within a client computing system using storage profiles according to the invention.

In the client system 110, a managed storage system 120 is provided to provide data storage functionality and capacity to the client system 110. The managed storage system 120 may take numerous forms to practice the invention (with some exemplary implementations being discussed in detail below). Generally, the managed storage system 120 includes a service processor 122 running a storage manager 126, which is a software application that functions to manage operation of the data storage system 130 including configuration of the system 130 into storage pools. The storage system 130 may take many forms having a variety of storage devices including a variety of storage media, controllers, and the like. As an example, the storage system is shown to have both disks 134 and tapes 138 (e.g., disk drives and tape drives with associated controllers (not shown)). The data storage system 130 may be provided as a separate physical component or the data storage system 130, storage manager 126, processor 122 and memory 140 may be provided as a unit, such as on a physical rack. The storage system 130 may include one or more arrays made up of trays of 1 to 14 or more disks or disk drives and controllers. As is known in the art, the disks 134 may be grouped into RAID sets and/or virtual disks with or without hot spare arrays, and in typical embodiments, multiple RAID sets or virtual disks may be combined into a single storage pool if they have the same properties. The storage pools are typically defined according to the present invention to allow volumes to span across RAID sets or virtual disks through the use of virtualization, concatenation, striping and/or partitioning.

In this regard, the managed storage system 120 includes memory 140 storing non-profile parameters 142 which include definitions for parameters that are not set by storage profiles but are instead fixed for the data storage system 130. According to an important aspect of the invention, the storage manager 126 is adapted for applying storage profiles that define a set of operating and/or configuration parameters to the data storage system 130 to configure the disks 134 and/or tapes 138 (or other components) to configure the data storage system 130. The configuration typically results in the data storage system 130 being arranged in a data storage hierarchy, such as that shown in FIG. 2. The storage profiles used for such configuration can include one or more of the pre-defined (or factory-deliverable) storage profiles 146 with a defined parameter set 148 and/or one or more of the user-defined storage profiles 150 with a defined parameter set 156.

As will become clear, the pre-defined storage profiles 146 typically are shipped with the managed storage system 120 and as such, are used to define storage pools that are particularly well-suited for common applications or operating environments. In some cases, the pre-defined storage pools 146 are installed on a previously installed managed storage system 120, such as part of an upgrade process. In other cases, a profile developer system 170 is included in the system 100 and during operation of the system 100, the profile developer system 170 stores in its memory 172 one or more pre-defined storage profiles 174 with a set of predefined parameters 176 for a storage pool and upon request or periodically, transfers (such as over the communications network 160) one or more of the profiles 174 to the client system 110 for storage in memory 140 in pre-defined storage profiles 146. For example, new storage profiles 174 may be developed on an ongoing basis for existing or new applications or operating environments, and the system 100 supports remote transfer to the client system 110, e.g., to upgrade the managed storage system 120.

The use of storage profiles 146, 150 is important because a one-size or one configuration fits all arrangement of data storage systems is typically not effective. Storage profiles can be thought of as a recipe for storage allocation providing definition of characteristics of storage allocated to storage pools. During operation, the administrative node 112 is requested to apply a particular profile 146, 150 or to apply a set of selected profiles 146, 150 to data storage system 130 to allocate and configure the disks 134 and/or tapes 138 for use by the applications 118 (or other components within or outside the client system 110). The non-profile parameters 142 include fixed parameters that are applied to all storage pools for data storage system 130 (or, in some embodiments, these parameters are included as non-settable/changeable parameters in pre-defined storage profiles 146) and are, at least in some embodiments, used along with selected profiles 146, 150 to allocate storage within system 130 by storage manager 126.

The parameters that are included in defined parameter sets 148, 156 may range from a few operating characteristics to a very large number. The particular parameters that can or need to be set will vary with the configuration (such as which components 134, 138) of the data storage system. For example, the pre-defined storage profiles 146 shipped with or provided for each data storage system 130 may vary to facilitate proper configuration of the data storage system 130 using profiles 146 and user-defined storage profiles 150 which are typically built upon pre-defined storage profiles 146 (as will be explained in more detail with reference to FIG. 4). Exemplary, but not limiting, parameters that may be included in the defined parameter sets 148, 156 (or in non-profile parameters) are presented in the following table along with possible values or settings. In the table, "MR-1" refers to a collection of 1×1, 1×2, and/or 1×3 arrays, "MR-2" refers to a collection of 2×2, 2×4, and/or 2×6 arrays, "MR-3" refers to a storage system with one or more MR-1s or MR-2s, a service processor, and a storage manager, and "Enterprise" refers to a storage system with one or more MR-1s or MR-2s, a DSP, a service processor, and a data manager.

| Parameter Name | Possible Values or Variable Type | Description |
| --- | --- | --- |
| Name | 32 Character A/N | Unique Identifier for the storage profile |
| Description | 256 Char. A/N | Description of the storage profile |
| Product | 32 Character A/N | A version number for the product to |

-continued

| Parameter Name | Possible Values or Variable Type | Description |
|---|---|---|
| Version | | support backward/forward compatibility of a storage profile. This field is set and managed by the management software and is not customer definable or viewable. |
| Segment Size | 4, 8, 16, 32, or 64K | Array Segment Size |
| Read Ahead | On/Off | Array Read Ahead Mode |
| Raid Level | 0, 1, 5 | Raid Level configured across all disks within a virtual disk |
| Array Type | 1) Exact Match - IOPS (1 × 2, 2 × 4 array) 2) Exact Match - Bandwidth (1 × 1, 2 × 2 array) 3) Exact Match - Capacity 1 × 3, 2 × 6 array) 4) Best Available Match - IOPS 5) Best Available Match - Bandwidth 6) Best Available Match - Capacity | Determines the specific array type to use. The first three choices match only one array configuration (1 × 1, 1 × 2, 1 × 3, 2 × 2, 2 × 4, and 2 × 6). If a profile has any one of these three parameter settings and the specific array is not available, then this profile cannot be applied. An error message will explain to the user why they cannot apply this profile. The second three choices attempt to match the best available array based on the environment (IOPs, Bandwidth, and Capacity). For example, 'Best Available Match - Capacity' will search for 2 × 6s, then 2 × 4s, then 2 × 2s. The following rules apply to the 3 "Best Available Match" settings:<br>(MR-1) IOPS:<br>1 × 2 -> 1 × 1 -> 1 × 3<br>(MR-1) Bandwidth:<br>1 × 1 -> 1 × 2 -> 1 × 3 -><br>(MR-1) Capacity:<br>1 × 3 -> 1 × 2 -> 1 × 1<br>(MR-2, MR-3) IOPS:<br>2 × 4 -> 2 × 2 -> 2 × 6<br>(MR-2, MR-3) Bandwidth:<br>2 × 2 -> 2 × 4 -> 2 × 6<br>(MR-2, MR-3) Capacity:<br>2 × 6 -> 2 × 4 -> . × 2 × 2<br>Please note that for the last three choices, the array or system will determine the best available match, not the user. |
| Number of Disks | 2-14, Variable | This setting determines . . . How many disks to group together when creating a virtual disk or Characteristic number of disks for each virtual disk used in a storage pool. For example, if creating a storage pool with setting = 7, any virtual disk that is part of the storage pool must have 7 disks. If this setting = "Variable", then the virtual disks making up the storage pool can have different numbers of disks in them (one virtual disk can have 10 disks, another virtual disk can have 13 disks, etc.) When using "Variable", the user (not the system) will choose what virtual disks can be allocated to the storage pool being created with this profile. Also, this parameter will be used similarly to "Exact Match" parameter setting of "Array Type". In other words, if a profile has this set to "7", only raid sets/virtual disks with 7 disks are acceptable. If none are available, then the profile cannot be applied to the storage pool and the user will receive an error message indicating why they cannot create a storage pool with this profile. |
| Dedicated Hot Spare | Yes or No | Possible Value = Yes indicates . . . one dedicated hot spare for each virtual disk that comprises the storage pool dedicated hot spare per virtual disk is taken from same tray as virtual disk (thus, there could be two dedicated hot spares per tray) |
| Virtualization Strategy | Concatenate/Stripe | Dictates the strategy used for ALL volumes allocated from a storage pool. "Concatenate" . . . is primarily for sequential environments minimizes partitioning of virtual disks to help sequential environments concatenates virtual disk partitions to create virtual volumes implements necessary algorithms to create virtual volumes from "best fit" virtual disks (to minimize overall partitioning of virtual disks in the storage pool) "Stripe" stripes across multiple partitions when creating virtual volumes (primarily for random environments) |
| Stripe Size | 128K, 512K, 1M, 2M, 4M, 8M, 16M | This setting will define the default value used when a user request to create a volume from a storage pool. This field is only valid when the Virtualization Strategy is set to 'Stripe'. Every volume created from a storage pool will have the same stripe size. In other words, if you wanted to create a volume with a different stripe size, you will have to create a complete new storage pool that is almost identical to the first storage pool, but just with a different stripe size. |

As the art of optimizing use of storage becomes better defined or more of a science, storage distributors and profile developers 170 will be able to provide new and improved recipes or profiles with pre-defined storage profiles 146 to better allocate storage based on the needs of applications 118 or client system 110 operating environments. In situations where the customer knows best, the system 100 provides tools for creating and maintaining their own user-defined storage profiles 150 with their allocation recipes which allow them to customize storage allocation within the data storage system 130.

FIG. 2 illustrates in hierarchy form a data storage system 200, such as system 130 of FIG. 1, configured using storage profiles according to the present invention. As shown, the system 200 is configured through the application of storage profiles 210 (i.e., Profiles A and B). The storage profiles 210 are used to define the characteristics of pools 220 of the system 200 as shown by pool 222 and pool 226 (i.e., Pool A and Pool B). As shown in this exemplary allocation, two volumes 230 are created from the storage allocated to storage Pool A and one volume 234 is formed from the storage allocated to storage Pool B. Again, the volumes 230, 234 are created based on the parameters defined in the profiles 210. Additionally, Pool A includes virtual disk 240 and a number of disks 254 in tray 250, and Pool B includes virtual disk 246 and a number of disks 258 in tray 250. As shown, Pool A and Pool B include the same number of virtual disks and disks but in many embodiments, each storage pool created according to a storage profile 210 will be configured differently based on the definitions within the profile 210 (e.g., the profile 210 typically will define differing numbers of virtual disks, disks, volumes, and other pool parameters). The profiles 210, as will become clear, may be pre-defined storage profiles or user-defined storage profiles (or one of each). Also, while Pools A and B are shown only to include disks 254, 258, it should be understood that tape drives can be included in a storage pool along with disks. One of the important concepts shown in FIG. 2 is that storage profiles 210 are applied to a data storage system 200 to define the configuration of the system 200 including, in some embodiments, parameters or characteristics at each level of the storage hierarchy.

Figure 3:
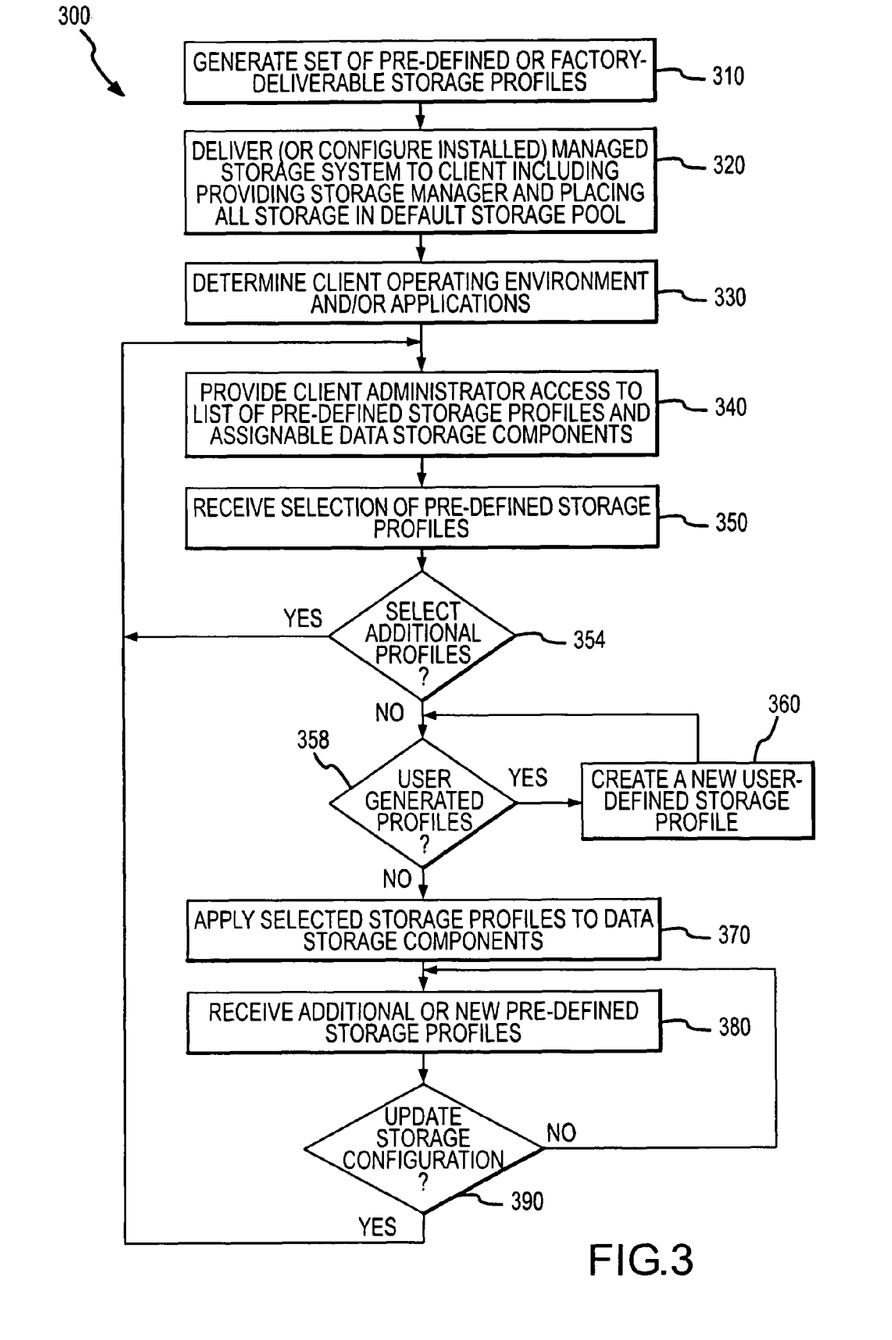
FIG. 3 illustrates an exemplary process for distributing and configuring data storage systems with a storage manager that utilizes storage profiles to configure storage components.

FIG. 3 illustrates a data storage management process 300 according to the invention that includes the use of storage profiles to allocate and configure a data storage system, as may be implemented by the operation of the system 100 of FIG. 1. At 310, a set of pre-defined or factory-deliverable storage profiles is generated or collected. For example, a distributor of data storage systems may generate a set of storage profiles that are particularly useful with their storage systems and the components included in such systems. Moreover, in preferred embodiments, these pre-defined storage profiles are used to define storage system parameters to allocate the storage and configure the storage to best or better support particular applications or client uses. For example, a storage pool that is adapted for supporting a large e-commerce application will likely vary from a storage pool that is adapted for supporting a mail spooling application. At 310, the pre-defined storage profiles may also be obtained from one or more third parties (such as from profile developer system 170 of FIG. 1).

As discussed above, the pre-defined storage profiles can be thought of as a recipe for allocating storage and each storage profile is defined by the set of parameters it sets and the values it defines for this set of parameters. The pre-defined storage profiles generated at 310 preferably provide sufficient information for a user to determine how to allocate storage based on application type, i.e., include a profile name, profile description, or other parameters that indicate which application or applications or operating environments each storage profile is well suited for supporting (e.g., through creation of a storage pool for that application(s)).

It may be useful at this point to discuss some exemplary storage allocation settings or parameters that can be provided in a pre-defined storage pool based on the expected application to improve effectiveness. In typical disk-based storage, an array type is defined by the number of controllers by or relative to (or "x") the number of trays, e.g., 1×1, 1×2, 1×3, 2×2, 2×4, 2×6, and the like. It is known in the art that for random I/O workloads, disks are the bottleneck and not the controller, and hence, random performance scales from 2×2 to 2×4 to 2×6 (and from 1×1 to 1×2 to 1×3) but scaling in not linear. It is also known that for sequential I/O workload, controllers are the bottleneck and not the disks, and 2×2 arrays are typically best suited for sequential performance followed by 2×4 arrays and then 2×6 arrays. This same order or rating applies to random environments.

With these considerations in mind, pre-defined storage profiles can be generated based on anticipated applications or operating environments to allocate and/or configure the data storage in the managed storage system to better support the expected applications or operating environment(s). For example, the set of parameters may be selected such that 2×2 arrays are allocated for random and sequential environments, such that 2×4 arrays are used in some cases with random environments but typically not for sequential environments, and such that 2×6 arrays are used for high capacity, low performance, low cost environments, are sometimes allocated or used for random environments (such as when 2×2 or 2×4 arrays are not available in the data storage), and are typically not used for sequential applications or environments. In some embodiments, these settings are achieved by setting the "array type" parameter in the pre-defined storage profiles.

The following table provides an exemplary set of pre-defined or factory-deliverable storage profiles that may be generated and shipped. The profile name and description parameters are provided for the exemplary profiles and typically include adequate information for an operator of the administrative node (such as node 112) and administrative GUI (such as GUI 114) to determine which storage profiles should be used to support their particular operating environment and applications (such as applications 118). As can be seen in the table, there is a wide variety of pre-defined storage profiles that may be useful for a particular storage system and operating environment and a default allocation is likely not going to be effective for operating and managing a data storage system.

| Factory-Deliverable Profiles Table | |
|---|---|
| Profile Name | Description |
| Default | Factory setting - 7 drives, RAID5, read ahead off |
| Sequential | S5 - 7 drives, RAID5, 64K stripe, read ahead on |
| Random 5 | R5 - 7 drives, RAID5 64K stripe, read ahead off |
| Random 1 | R1 - 7 drives, RAID5, 32K stripe, read ahead on |
| High Performance Computing | HPC - 7 drives, RAID5, 64K stripe, read ahead on |
| Mail Spooling | Mail - 7 drives, RAID1, 64K stripe, read ahead off |
| NFS - Striping | NFS HA - 7 drives, RAID5, 64K stripe, read ahead off |
| NFS - Mirroring | NFS non-HA - 7 drives, RAID1 64K, read ahead off |
| Oracle OLTP | OLTP non-HA - 7 drives, RAID1, 32K stripe, read ahead off |
| Oracle OLTP HA | OLTP HA - 7 drives, RAID1, 32K stripe, read ahead off |
| Oracle DSS | DSS - 7 drives, RAID5, 64K stripe, read ahead off |
| Sybase OLTP | OLTP non-HA - 7 drives, RAID5, 32K stripe, read ahead off |
| Sybase OLTP HA | OLTP HA - 7 drives RAID1, 32K stripe, read ahead off |
| Sybase DSS | DSS - 7 drives, RAID5, 64K stripe, read ahead off |

At 320, a managed storage system is delivered or shipped to a client location, and the storage manager and set of pre-defined storage profiles are included within the managed storage system (or an existing client storage system is configured to include a storage manager adapted for using storage profiles according to the invention and one or more pre-defined storage profiles). In some embodiments, the managed storage system is shipped or initially installed with all storage placed or allocated in one storage pool with a "default" storage profile (i.e., a particular one of the pre-defined storage profiles) applied to this single storage pool. The preconfiguration of the shipped (or installed) managed storage system may include configuring one or more RAID sets and may include allocating or configuring hot spares for the data storage (e.g., providing a hot spare pool). These default or initial settings can, of course, later be modified by the client, such as through the application of storage profiles to create storage pools, and may for example, include adding a dedicated hot spare, modifying RAID sets, adding or removing disks or capacity from the spares or RAID sets, and the like. Some of the preconfiguration of the data storage may be considered to be part of the non-profile parameters (see element 142 of FIG. 1). For example, in some embodiments, parameters such as write back policy, reconstruction policy, global hot spare pool, and other parameters that are defined at the array level are not part of a storage profile (pre-defined or user-defined) but yet are used in managing or allocating storage by included storage manager.

The shipped or installed pre-defined storage profiles are preferably tailored or selected based on the particular data storage system provided in the managed storage system. As discussed above, a default storage pool or storage allocation is typically not well suited for all clients, and likewise, a single set of pre-defined storage profiles is not preferred to practice the invention. Instead, a set of pre-defined storage profiles determined by the storage distributor or other personnel to be well suited for the data storage system is provided at step 320 in the process 300. The following tables are exemplary sets of pre-defined storage profiles that may be shipped with managed storage systems that include MR-1, MR-2, MR-3, and Enterprise storage systems. The defined parameter set (such as set 148 of FIG. 1) is relatively small and is provided as only a sample of the types of storage characteristics or operating parameters that may be defined by the profiles. For example, it will be understood that additional parameters such as disk speed, disk capacity, access mode, cache, data format, overflow location, and other parameters may be added or included in the set of parameters defined by the storage profiles. However, even with this small sampling, it can be seen that the parameters vary or differ among the applications or operating environments and providing the pre-defined profiles improves the effectiveness of allocating storage for a client. The client or administrator only needs to know their applications to effectively allocate data storage rather than having to set each parameter for each pool they wish to establish.

Profile Settings: MR-1

| Profile Name | RAID level | Segment Size | Read Ahead Mode | # Drives | Array Type | Dedicated Hot Spare? |
|---|---|---|---|---|---|---|
| Default | RAID5 | 32K | Off | Variable | Best Available Match - Bandwidth | No |
| Sequential | RAID5 | 32K | On | Variable | Exact Match - Bandwidth | No |
| Random 5 | RAID5 | 64K | Off | Variable | Best Available Match - IOPS | No |
| Random 1 | RAID1 | 65K | Off | Variable | Best Available Match - IOPS | No |
| High Performance Computing | RAID5 | 32K | On | Variable | Exact Match - Bandwidth | No |
| Mail Spooling | RAID1 | 64K | Off | Variable | Best Available Match - IOPS | No |
| NFS - Striping | RAID5 | 64K | Off | Variable | Best Available Match - IOPS | No |
| NFS - Mirroring | RAID1 | 64K | Off | Variable | Best Available Match - IOPS | No |
| Oracle OLTP | RAID5 | 32K | Off | Variable | Best Available Match - IOPS | No |
| Oracle OLTP HA | RAID1 | 32K | Off | Variable | Best Available Match - IOPS | No |
| Oracle DSS | RAID5 | 64K | Off | Variable | Best Available Match - IOPS | No |
| Sybase OLTP | RAID5 | 32K | Off | Variable | Best Available Match - IOPS | No |
| Sybase OLTP HA | RAID1 | 32K | Off | Variable | Best Available Match - IOPS | No |
| Sybase DSS | RAID5 | 64K | Off | Variable | Best Available Match - IOPS | No |

Profile Settings: Enterprise

| Profile Name | RAID Level | Segment Size | Read Ahead Mode | # Drives | Array Type | Dedicated Hot Spare? | Virtual Strategy | Stripe Size |
|---|---|---|---|---|---|---|---|---|
| Default | RAID5 | 32K | Off | Variable | Best Available Match - Bandwidth | No | Stripe | 1M |
| Sequential | RAID5 | 32K | On | Variable | Exact Match - Bandwidth | No | Concatenate | N/A |
| Random 5 | RAID5 | 64K | Off | Variable | Best Available Match - IOPS | No | Stripe | 2M |
| Random 1 | RAID 1 | 64K | Off | Variable | Best Available Match - IOPS | No | Stripe | 2M |
| High Performance Computing | RAID5 | 32K | On | Variable | Exact Match - Bandwidth | No | Concatenate | N/A |
| Mail Spooling | RAID1 | 64K | Off | Variable | Best Available Match - IOPS | No | Stripe | 2M |
| NFS - Striping | RAID5 | 64K | Off | Variable | Best Available Match - IOPS | No | Stripe | 2M |

-continued

Profile Settings: Enterprise

| Profile Name | RAID Level | Segment Size | Read Ahead Mode | # Drives | Array Type | Dedicated Hot Spare? | Virtual Strategy | Stripe Size |
|---|---|---|---|---|---|---|---|---|
| NFS - Mirroring | RAID1 | 64K | Off | Variable | Best Available Match - IOPS | No | Stripe | 2M |
| Oracle OLTP | RAID5 | 32K | Off | Variable | Best Available Match IOPS | No | Stripe | 1M |
| Oracle OLTP HA | RAID 1 | 32K | Off | Variable | Best Available Match - IOPS | No | Stripe | 1M |
| Oracle DSS | RAID5 | 64K | Off | Variable | Best Available Match - IOPS | N | Stripe | 2M |
| Sybase OLTP | RAID5 | 32K | Off | Variable | Best Available Match - IOPS | No | Stripe | 1M |
| Sybase OLTP HA | RAID1 | 32K | Off | Variable | Best Available Match - IOPS | No | Stripe | 1M |
| Sybase DSS | RAID5 | 64K | Off | Variable | Best Available Match - IOPS | No | Stripe | 2M |

The process 300 continues at 330 with determining the operating environment or the applications that will be supported by the managed storage system. This step is often performed by a data storage administrator of the customer, client, or entity that is using the managed storage system but may be performed in part by personnel from the storage distributor. Once the environment and/or applications are defined or understood, the client administrator is provided at 340 with a list of the pre-defined storage profiles stored in the managed storage system (or available such as via a network from a profile developer as shown in FIG. 1). The listing may also include portions of the data storage system in the managed storage system that are available for allocation, e.g., components that may be allocated to storage pools through the use of the listed storage profiles or remaining unallocated storage. The list may be provide via hard copy but typically is provided through a GUI by a storage manager or other software (see elements 114 and 126 of the system 100 of FIG. 1).

For example, the listing may take a form similar to the tables provided above indicating exemplary pre-defined storage profile sets for various data storage configurations. Through the GUI, the administrator can select one or more of the pre-defined storage profiles to apply and the process 300 continues at 350 with receiving, such as through the GUI, selection input of one or more of the pre-defined storage profiles. The selection input may include portions of the storage system to apply the profile (e.g., assign particular selected profiles to particular arrays and the like in the data storage system) but in many embodiments, such allocation details are performed by the storage manager when applying the selected profiles. In practice, the same profile may be applied throughout a data storage system or a client may apply 2 or more profiles to the data storage system to support various data processing and storing applications.

Additionally, the selected profile(s) may be applied to all or part of an array or other subset or subsystem of a data storage system. Further, some pre-defined profiles may include parameters that have to or can be selected or set by the user or administrator. For example, some profiles may dictate the number of disks to be used when creating the virtual disk while other profiles may leave this to the administrator's or client's discretion (or provide a set of acceptable numbers for the administrator or client to choose from such as in a pull down box). Some restrictions may apply to the selection process to ensure the compatibility of later created storage pools. For example, once a profile is selected for a portion of a data storage system (such as a tray), the set of available or listed profiles may be changed or reduced to only include those profiles that are compatible with the profile or profiles already applied (or selected for application) to the portion of the data storage system (e.g., to avoid the need for destruction of all other virtual disks on an array or to control other problems). This is due in part to the fact the some parameters defined with storage profiles may be global settings that apply, for example, to all trays in an array.

At 354, the process 300 continues with determination of whether additional profiles can be or will be selected. For example, selection at 350 may include selecting one or more profiles and at 354 it may be determined that there is no more unallocated storage (or not enough to support a pool). Or, the client or administrator may indicate that they do not wish to apply any more of the pre-defined storage profiles. If yes, the process 300 continues at 340, and if no more selections, the process 300 proceeds to step 358 where it is determined whether the user or administrator wishes to generate a user-defined storage profile. If no, the process continues to step 370, and if yes, the process continues with creation of a new user-defined storage profile.

Figure 4:
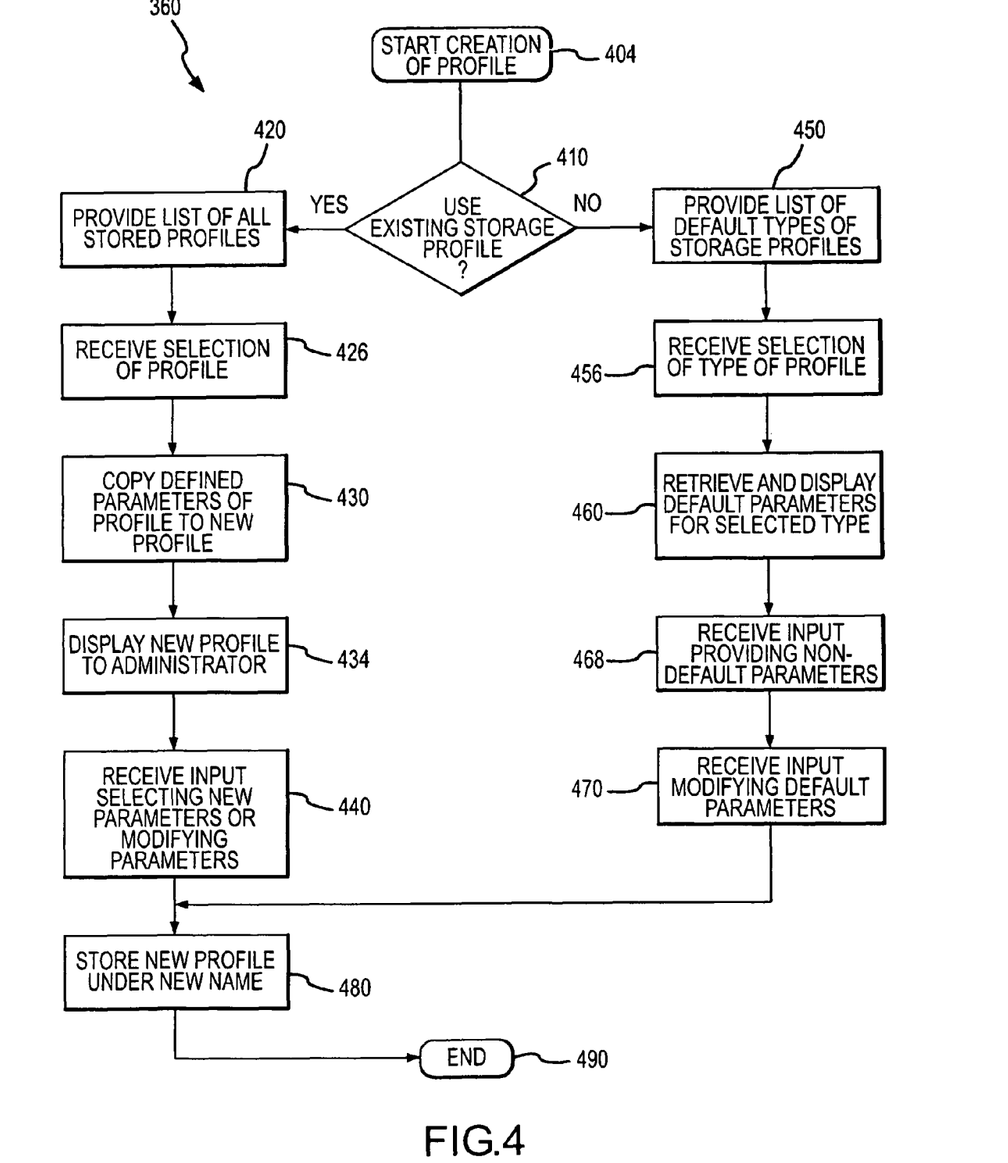
FIG. 4 illustrates a portion of the process of FIG. 3 in which a new storage profile is generated for use in customizing a data storage system for supporting an operating environment and/or specific client applications.

FIG. 4 illustrates process 360 of creating a new user-defined storage profile in more detail. The process 360 begins at 404 and generally includes a user or administrator defining values for all parameters that make up a storage-profile. The restrictions described above for selecting pre-defined storage profiles would be also applicable to user-defined storage profiles. As shown, there are two ways to create a new storage profile, and at 410, the user is prompted or decides whether to use or build on an existing storage profile, which may be a pre-defined storage profile or a previously created user-defined storage profile.

In one method, the user decides at 410 to use an existing storage profile. At 420, the user is provided a listing of all stored or available storage profiles. At 426, the user inputs a selection of one of the listed profiles and this input is received by the storage manager. At 430, the storage manager copies the defined parameters of the selected profile into a new user-defined or custom storage profile. The new profile is then displayed at 434 to the user (or a hard copy of copied parameters is provided). For example, the storage manager 126 may act to generate a GUI 114 on the administrator node 112 that provides the current settings or parameter values for the new profile.

Figure 5:
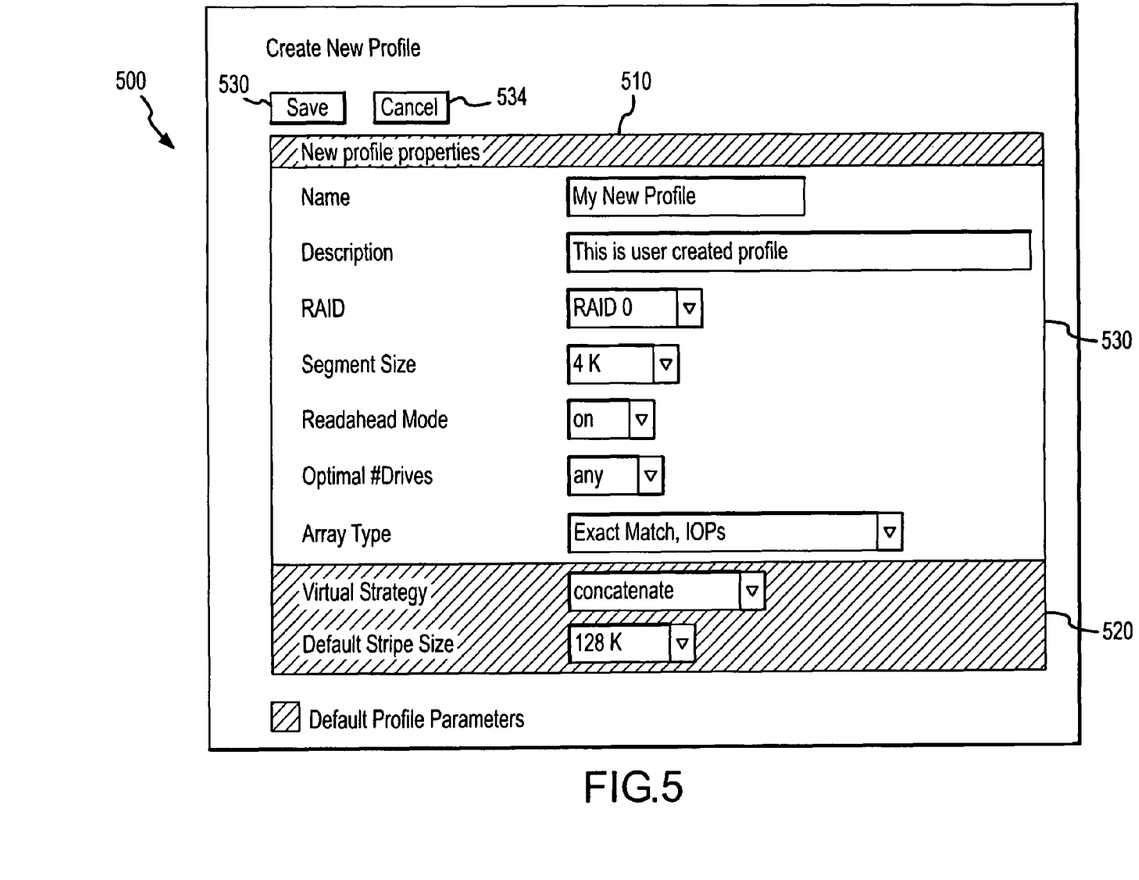
FIG. 5 illustrates a screen shot of a graphical user interface (GUI) that may be provided by the storage manager of the system of FIG. 1 for facilitating creation of a new profile according to the process of FIG. 4 or another creation process.

FIG. 5 illustrates a screen shot of an exemplary GUI 500 for use in creating a new storage profile as part of process 360. As shown, an input box 510 is provided with an input area 530 for the user to provide values for "back end" parameters of the new profile. The back end parameters are applied when new storage is added to a pool and are shown as including, for example, a description, RAID levels, segment sizes, read ahead mode, optimal number of drive, and array type. Dialog boxes are provided that show the present value of each of the parameters that need to be set (or accepted in the present form). The initial values shown are those copied from the selected existing profile (although name and description may be default values or left blank) or are default values for a new profile. Some of the parameters, such as segment size, may provide the present value and options for modifying the value, such as with a pull down list of acceptable values. In this manner, the user can modify the parameters but is provided a list of only those values that can be used to define a storage pool. In some cases, the listed values in area 530 may be selected based on restrictions created by prior assigned pools, by the particular data storage system and its components, or based on other characteristics of the managed storage system. In the input box 510, another input area 520 is included for the user to enter "front end" parameters that are applied when volumes are being added to a pool. The front end parameters may include, for example, a virtual strategy, default stripe size, and the like.

When the user has set all the parameters, a save button 530 can be selected to store the new user-defined or custom storage profile, i.e., the steps of receiving the input selecting the new parameters or modifying parameters 440 and storing the new profile 480 are completed in process 360. Alternatively, a cancel button 534 may be selected to terminate the profile creation process 360 and control is passed to step 490 of process 360 and to process 300 at 358 where it is determined whether the user wishes to create another user-defined profile.

At 410, the user may elect to create a custom or user-defined storage profile from scratch or without copying parameter values. According to one embodiment, the user is provided with recommended or default values for a storage profile based on the type or configuration of the data storage system. The default or recommended parameter values are displayed in a screen or GUI, such as that shown in FIG. 5 at 500, and some or all of the parameter values can be modified by entering a new value or more preferably, by the user selecting from a set of acceptable values for each of the displayed parameters. Hence, at 450, the user may be provided with a list of types of profiles or profiles for types of storage. For example, the user may be prompted to select between MR-1, MR-2, MR-3, Enterprise, and/or other types or configurations of data storage systems.

At 456, the user's selection of profile type or data storage type is received, and at 460, the data manager retrieves and displays (such as in a GUI 500 shown in FIG. 5) the default values for a set of parameters that should be defined for a particular storage profile. As will be appreciated, the values of the parameters may vary based on the type of storage being pooled and the set of parameters that can/should be set for each type may vary (e.g., more complex storage systems, such as Enterprise systems, typically will include more parameters). At 468 and 470, the data manager, such as through an administrative GUI, receives input providing non-default parameters and modifying default parameters (or accepting those displayed or provided). At 480, the new profile is stored under the new name and creation process 360 ends at 490 and control is returned to process 300 at 358.

At 370, the profile settings are used to simplify the configuration of the storage components when raw storage is added to a pool and when volumes are created from pools and allocated to servers. Once the administrator has created a pool with a specific profile, the amount of additional information they need to provide in order to complete the configuration tasks is minimal. When an administrator adds raw (un-configured) storage to a pool, the system uses the profile settings associated with the specific profile assigned to the specific pool to create (configure) the virtual disks that reside in the pool. When an administrator creates a volume from the pool, the system again utilizes the profile settings associated with the specific profile assigned to the specific pool to complete the task for the administrator. At 380, the process 300 continues with receipt of additional or new/modified pre-defined storage profiles. For example, with reference to FIG. 1, the profile developer 170 may create additional profiles 174 and these are transferred over the network (or otherwise) to the client system 110 for storage as profiles 146. At 390, the user is prompted to or inputs a request to update the storage configuration. If no, the process continues with waiting for or receiving additional profiles. If yes, the process 300 continues at 340 with providing the user or administrator with a list of presently available storage profiles (user-defined and/or pre-defined storage profiled originally installed or later received). The receiving of profiles may also involve the client or administrator accessing a remote repository of profiles and selectively retrieving profiles for use in the managed storage system.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for allocating storage in a data storage system, comprising:
    providing a set of storage profiles, each storage profile comprising a set of parameters each with a value defined for the data storage system and for an application using the data storage system;
    receiving a selection of one of the storage profiles;
    applying the selected one of the storage profiles to the data storage system to allocate a portion of the data storage system to a first storage pool defined by the set of parameters associated with the selected one of the storage profiles;

providing a subset of the set of storage profiles that are selected based on the applying of the selected one of the storage profiles to the data storage system, wherein the subset of the set of storage profiles are compatible with the selected one of the storage profiles;

receiving a selection of a second one of the storage profiles; and applying the selected second one of the storage profiles to the data storage system to allocate a second portion of the data storage system to a second storage pool defined by the set of parameters associated with the selected second one of the storage profiles, wherein the first storage pool and the second storage pool operate simultaneously.

2. The method of claim 1, wherein the parameters are selected from the group consisting of a description of the storage profile identifying the application, segment size, virtual strategy, stripe size, array type, RAID level, read ahead mode, number of drives, disk size, disk speed, and cache.

3. The method of claim 1, further comprising prior to the receiving, displaying a list of the set of storage profiles and unallocated portions of the data storage system.

4. The method of claim 1, further comprising prior to the selection receiving, creating a user-defined storage profile for inclusion in the provided set of storage profiles.

5. The method of claim 4, wherein the creating of the user-defined storage profile comprises copying the set of parameters of one of the set of storage profiles to the created user-defined storage profile, receiving input indicating acceptance of the valued defined for each of the copied parameters or indicating a replacement value for each of the copied parameters.

6. The method of claim 4, wherein the creating of the user-defined storage profile comprises providing a list of types of storage profiles, receiving a selection of one of the storage profile types, providing a set of profile parameters including at least one default value selected based on the selected one of the storage profile types, and receiving input indicating a value of each of the provided profile parameters.

7. The method of claim 6, further wherein the creating of the user-defined storage profile comprises providing a set of values for at least some of the profile parameters, with the set of values being selected based on the selected one of the storage profile types and parameter value restrictions applying to the selected one of the storage profile types.

8. A managed storage system, comprising:
   memory;
   a data storage system comprising one or more data storage devices;
   a plurality of pre-defined storage profiles stored in the memory each comprising a set of data storage parameters with values defining a storage pool configuration; and
   a storage manager adapted for receiving a selection of at least one of the pre-defined storage profiles from a client node wherein the pre-defined storage profiles are each configured for supporting a differing application, displaying the selected at least one of the pre-defined storage profiles along with acceptable values for the data storage parameters for the selected at least one of the pre-defined storage profiles, receiving selection of one of the acceptable values for each of the data storage parameters, and allocating a portion of the data storage system to at least one storage pool defined by the values of the data storage parameters associated with the selected pre-defined storage profiles, wherein each storage pool is configured to operate simultaneously with each other storage pool.

9. The system of claim 8, wherein the pre-defined storage profiles are selected to be compatible with the one or more data storage devices in the data storage system.

10. The system of claim 8, wherein the data storage parameters are parameters selected from the group consisting of a description of the storage profile identifying the application, segment size, virtual strategy, stripe size, array type, RAID level, read ahead mode, number of drives, disk size, disk speed, and cache.

11. The system of claim 8, further comprising a plurality of user-defined storage profiles stored in the memory each comprising a set of data storage parameters with values selected or accepted by a user via a user interface generated by the storage manager.

12. The system of claim 11, wherein at least some of the values of the data storage parameters in the user-defined storage profiles are copied from one of the pre-defined storage profiles.

13. A data storage allocation method for use with a managed storage system having a data storage system, comprising:
   storing a set of pre-defined storage profiles in memory of the managed storage system, each of the pre-defined storage profiles defining a storage pool configuration with a set of parameters;
   selecting two or more of the storage profiles based on an operating environment of a computer system accessing the data storage system of the managed storage system, wherein the two or more of the storage profiles are compatible for concurrent application to the data storage system; and
   applying the selected two or more of the storage profiles to the data storage system to allocate the data storage system into two or more storage pools, wherein said two or more storage pools operate simultaneously.

14. The method of claim 13, wherein the selecting comprises displaying a user interface on a user node including a listing of the set of pre-defined storage profiles and receiving a user input indicating selection of the two or more of the storage profiles.

15. The method of claim 13, further comprising receiving a request to create a user-defined storage profile based on one of the pre-defined storage profiles, creating the user-defined storage profile by first copying the set of parameters of the one of the pre-defined storage profiles and second modifying the copied set of parameters based on received user input, and storing the created user-defined storage profile in the memory.

16. The method of claim 15, further comprising applying the stored user-defined storage profile to the data storage system to allocate the data storage system into an additional storage pool defined by the parameters in the applied user-defined storage profile.

17. The method of claim 13, further comprising after the applying, storing an additional pre-defined storage profile in the memory, selecting the additional pre-defined storage profile, and applying the selected additional pre-defined storage profile to the data storage system to allocate the data storage system into an additional storage pool defined by parameters in the additional pre-defined storage profile.

18. A managed storage system operated according to the method of claim 13.

* * * * *